E. W. VICKREY.
FAUCET.
APPLICATION FILED DEC. 13, 1912.
1,078,325.
Patented Nov. 11, 1913.
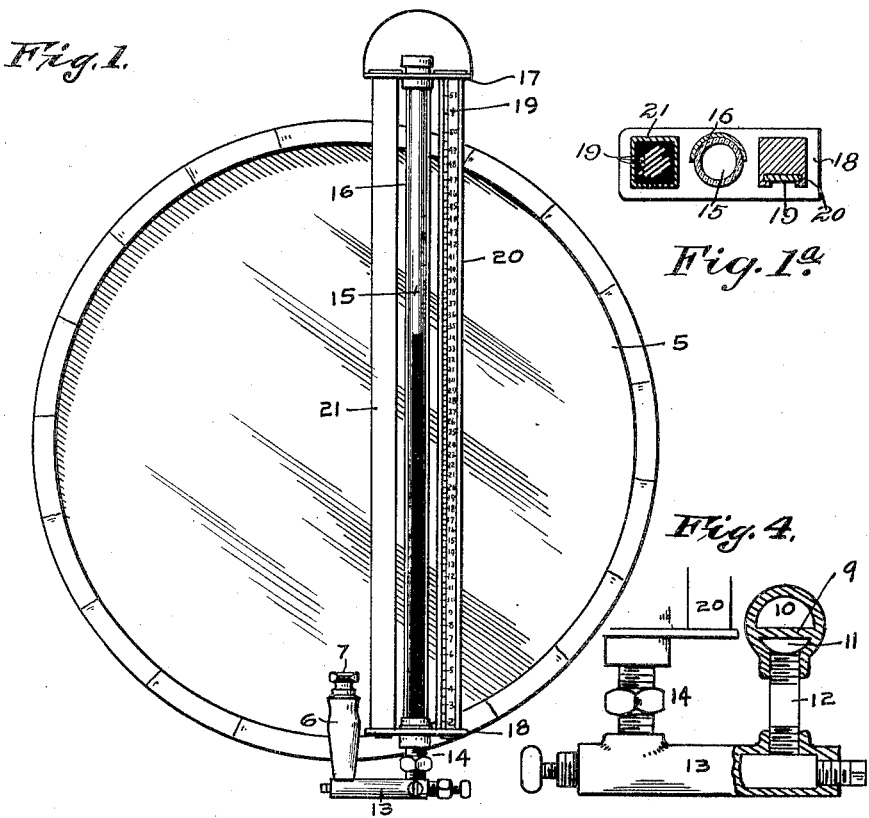
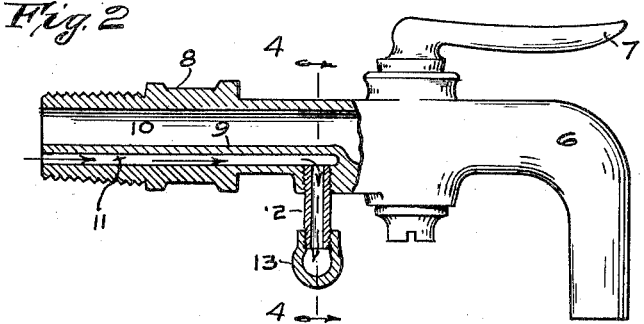
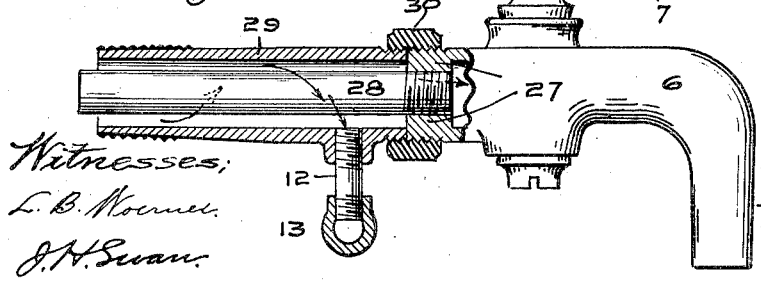
Inventor:
Eli W. Vickrey,

UNITED STATES PATENT OFFICE.

ELI W. VICKREY, OF INDIANAPOLIS, INDIANA.

FAUCET.

1,078,325.  Specification of Letters Patent.  Patented Nov. 11, 1913.

Application filed December 13, 1912. Serial No. 736,511.

*To all whom it may concern:*

Be it known that I, ELI W. VICKREY, a citizen of the United States, residing at Indianapolis, in the county of Marion and State of Indiana, have invented certain new and useful Improvements in Faucets, of which the following is a specification.

This invention relates to means for measuring the liquid contents of barrels, and other containers and to means for registering the amount of liquid at any time contained in the barrel. Devices for this purpose, and similar to my invention in general construction, are in use. I have reference particularly to liquid registers comprising a vertical glass tube connected at its lower end with the faucet through which the contents of the barrel is to be drawn off; but all of these devices, so far as I am aware, drain the liquid from the glass gage or stand-pipe immediately the faucet is opened, and the glass tube is only filled again, and the liquid visible, after the faucet has been closed and the tube refilled by the head of liquid in the barrel.

The object of my invention is to provide a separate communication between the vertical glass gage tube and the contents of the barrel whereby the opening of the faucet will not drain or disturb the height of the column of liquid in the tube, except as same is lowered in keeping with the lowering of the main body of liquid in the barrel by drawing it off through the faucet.

The further object of my invention is to associate the glass tube or stand with a volume measure or scale which will indicate to the operator the quantity of liquid in pints, quarts and gallons, or other desired measures, being drawn off through the faucet, whereby the operator will be able to draw any desired quantity of the liquid without the use of any other measure than is provided by said scale.

The above and other objects which will hereinafter appear, are accomplished by the mechanism illustrated in the accompanying drawing, in which—

Figure 1 is an end view of a barrel in its horizontal position with my measuring device applied thereto, and shown in front elevation. Fig. 1ª is a cross section of the glass tube gage and the repository for holding the scales when not in use. Fig. 2 is a side elevation and partial vertical section of the faucet as used in my invention. Fig. 3 is a like view of a somewhat modified form of my device, and Fig. 4 is a vertical section on the line 4—4 of Fig. 2.

Like characters of reference indicate like parts throughout the several views of the drawing.

5 is a barrel head of usual construction, 6 a faucet which is opened and closed by a valve plug operated by a handle 7 in the usual way.

8 is the threaded end of the faucet which is screwed into the bung of the barrel. This end 8 is hollow and is divided by a partition 9 into two compartments 10 and 11. The upper and larger compartment 10 communicates with the outer discharge end of the faucet and is opened and closed in the usual way by a valve plug connected with handle 7.

The lower compartment 11 terminates between the inner end of the faucet and said valve plug, generally adjacent the latter, and is connected by means of a short pipe 12 with a horizontal pipe 13 extending laterally of the portion of the faucet containing the compartments 10 and 11. Near the opposite end of the pipe 13 from the pipe 12 is a vertical gage-socket 14, in which a glass tube 15 is seated and sealed to prevent leakage around the tube. A passageway from the pipe 13 communicates with the interior of the glass tube 15, whereby an open communication between the tube 15 and the interior of the barrel is obtained.

It will be noted that while the compartment 11 is embodied in and is a part of the faucet unit, it is not in communication with the compartment 10 and that through said compartment 11, pipes 12 and 13 and socket 14 the glass stand-pipe 15 is in communication with the interior of the barrel quite independently of the general faucet outlet or discharge. This construction causes the column of liquid in the glass tube to remain always at the exact height of the body of liquid in the barrel, and the tube will not be emptied by the opening of the faucet, any faster than the body of liquid in the barrel is lowered by its discharge through the open faucet.

The glass tube 15 is preferably mounted in a mutilated metal tube 16. This metal tube extends the full length of the glass tube 15 and is cut away in front of the glass tube to make the latter visible. The mutilated metal tube 16 is supported by the gage-socket 14 and in turn supports a horizontal plate 17, and the plate 17 is parallel to a corresponding lower plate 18, which latter plate is supported by the gage-socket 14. Extending parallel with the glass tube 15, and supported by the horizontal plates 17 and 18 is a volume measure or scale 19 having suitable graduations representing gallons and fractions thereof, marked on it. The gallons marks will preferably be indicated by appropriate numerals from 1 to the capacity limit of the barrel. The graduations, it will be noted, are not the same distance apart, but are closest together at the middle of the barrel head and are increasingly farther apart in each direction from said middle. This is necessary on account of the varying capacity of the barrel at different levels when lying on its side. The graduations on the scale 19 are determined in advance for the different sizes of barrels, and as my invention may be used with barrels of various capacities I prefer to make the scales 19 on removable metal plates or ribbons which are adapted to be slipped in and out of a holder 20, whereby the gage of the required markings can be selected and placed on the holder when my device is installed in a full barrel. The gages which are not in use are stored in a holder 21 on the opposite side of the glass tube 15 from holder 20. The spaces between the gallons marks are subdivided into half-gallons, quarter-gallons or quarts, and the like, so that by noting the position of the column of liquid in the glass tube 15 as marked on the scale 19, a determinate quantity of the liquid may be drawn out through the faucet by watching the lowering of the column in the glass tube as measured on the scale 19.

In the modification shown in Fig. 3, the faucet 6 is shortened and closed by a plug 27 at its inner end, and a threaded hole in the center of the plug 27 receives a pipe 28 of somewhat less diameter than the normal bore of the faucet, and surrounding the pipe 28 is a tubular extension 29 of the faucet having a threaded end which is secured to the inner threaded end of the faucet 6 by a coupling ring 30. A compartment is thus provided, surrounding the pipe 28, which is independent of the main faucet discharge through the pipe 28, and the compartment around pipe 28 communicates with the glass tube 15 through a pipe 12 and pipe 13, in the same manner as has been described by the construction shown in the other figures of the drawing.

The operation of my invention will be readily understood from the foregoing description without further explanation.

While I have described my invention with more or less minuteness as regards details of construction and arrangement and as being embodied in certain precise forms I do not desire to be limited thereto unduly or any more than is pointed out in the claims. On the contrary, I contemplate all proper changes in form, construction and arrangement, the omission of immaterial elements and the substitution of equivalents as circumstances may suggest or necessity render expedient.

I claim:

1. The combination of a liquid-holding container, a faucet, a vertical glass tube, and a conduit connecting the interior of the container with that of the tube at the bottom of the latter, said conduit passing from the point of communication of said tube to the inlet of the faucet without communicating with the discharge conduit of the faucet.

2. The combination of a liquid-holding container, a faucet, a vertical glass tube, a conduit connecting the interior of the container with that of the tube at the bottom of the latter, said conduit passing from the point of communication of said tube to the inlet of the faucet without communicating with the discharge conduit of the faucet, and a scale to indicate the liquid contents of the container by the height of the liquid in the tube.

3. A liquid-holding container having a discharge opening, a faucet in said discharge opening having two compartments separate from each other but both communicating with the interior of the container, a vertical glass tube, one of said compartments discharging through the faucet, and means connecting the other compartment with the lower end of the glass tube.

4. A liquid-holding container having a discharge opening, a faucet in said discharge opening having two compartments separate from each other but both communicating with the interior of the container, a vertical glass tube, one of said compartments discharging through the faucet, means connecting the other compartment with the lower end of the glass tube, and a scale to indicate the liquid contents of the container by the height of the liquid in the tube.

In witness whereof, I, have hereunto set my hand and seal at Indianapolis, Indiana, this 2nd day of December, A. D. one thousand nine hundred and twelve.

ELI W. VICKREY. [L. S.]

Witnesses:
F. W. WOERNER,
I. L. LARSON.

---

Copies of this patent may be obtained for five cents each, by addressing the "Commissioner of Patents, Washington, D. C."